May 30, 1961 P. HOWELL 2,986,193
METHOD OF FORMING METAL BUILDING ELEMENTS
Filed Jan. 25, 1956 5 Sheets-Sheet 2

INVENTOR.
PAT HOWELL
BY
Morgan, Finnegan, Durham & Pine
ATTORNEYS.

May 30, 1961   P. HOWELL   2,986,193
METHOD OF FORMING METAL BUILDING ELEMENTS
Filed Jan. 25, 1956   5 Sheets-Sheet 4

INVENTOR.
PAT HOWELL
BY
Morgan, Finnegan, Durham & Pine
ATTORNEYS.

United States Patent Office 2,986,193
Patented May 30, 1961

2,986,193
METHOD OF FORMING METAL BUILDING ELEMENTS

Pat Howell, Dallas, Tex., assignor to Lifetime Metal Building Co., Dallas, Tex., a corporation of Texas Filed Jan. 25, 1956, Ser. No. 561,177

11 Claims. (Cl. 153—7)

The present invention relates to metal buildings, of relatively large size, such as may be used for farm buildings, stores, garages, storage houses, and the like, and to the method and mechanisms for making the essential elements of such buildings.

Objects and advantages of the invention will be set forth in part hereinafter and in part will be obvious herefrom or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

The present invention provides an improved metallic building structure which is adapted for use in a building of a relatively large size such as farm buildings for numerous uses, garages, stores, filling stations, storage houses, and similar buildings for many related purposes. The invention provides such buildings of improved and simplified design which are very sturdy yet extremely economical to build from the point of view of both the materials and labor going into the fabrication. The buildings of the invention are made of a plurality of side by side, corrugated metallic elements, which are suitably secured together at their abutting edges to form the completed buildings. Each such metallic corrugated element, in most embodiments of the invention, is a continuous, integral length of corrugated metal extending from one side support or foundation of the building to the other, with the elements so formed that, in cooperation with each other in the completed building, they are self-sustaining either as a complete structure or as a roof structure without the necessity for other bracing, reinforcing or covering materials. The method of making the corrugated building elements in accordance with the invention includes the curvature to concave cross-section of a strip of flat metal from a coiled spool of such metal, with identical formed lengths cut as completed and assembled side by side on a foundation to form the building, or, alternatively, the flat metal from the spool may first be cut into lengths and then corrugated and erected into a building. The formation of the corrugated building elements may and preferably does take place at the site of the building to be erected, so that expensive transportation of large and awkward materials for the building is entirely avoided. The mechanism of the invention includes cooperating roller means for imparting a longitudinal corrugation or U-shape to a length of flat metallic stock moving therethrough, and a longitudinal curvature or arc formation may also be given to the stock, with varying radii of curvature as desired, in the formation of integral building elements which are assembled side by side in the building. The mechanism and method of the invention also includes the making of sharp bends along the length of a corrugated building element which may be longitudinally straight or curved, when the same is desired in the shape of the completed building, and the advantages of integrated form and strong self-sustaining design is still maintained for each such element. The invention in one of its aspects comprises the formation of a round, silo-like, structure with a continuous spiral length of corrugated metal as the side wall of the building. Other objects and features of the present invention will be apparent from the detailed description which follows of the illustrative embodiments of the invention shown in the accompanying drawings.

Figures 1, 2, 3, 4:
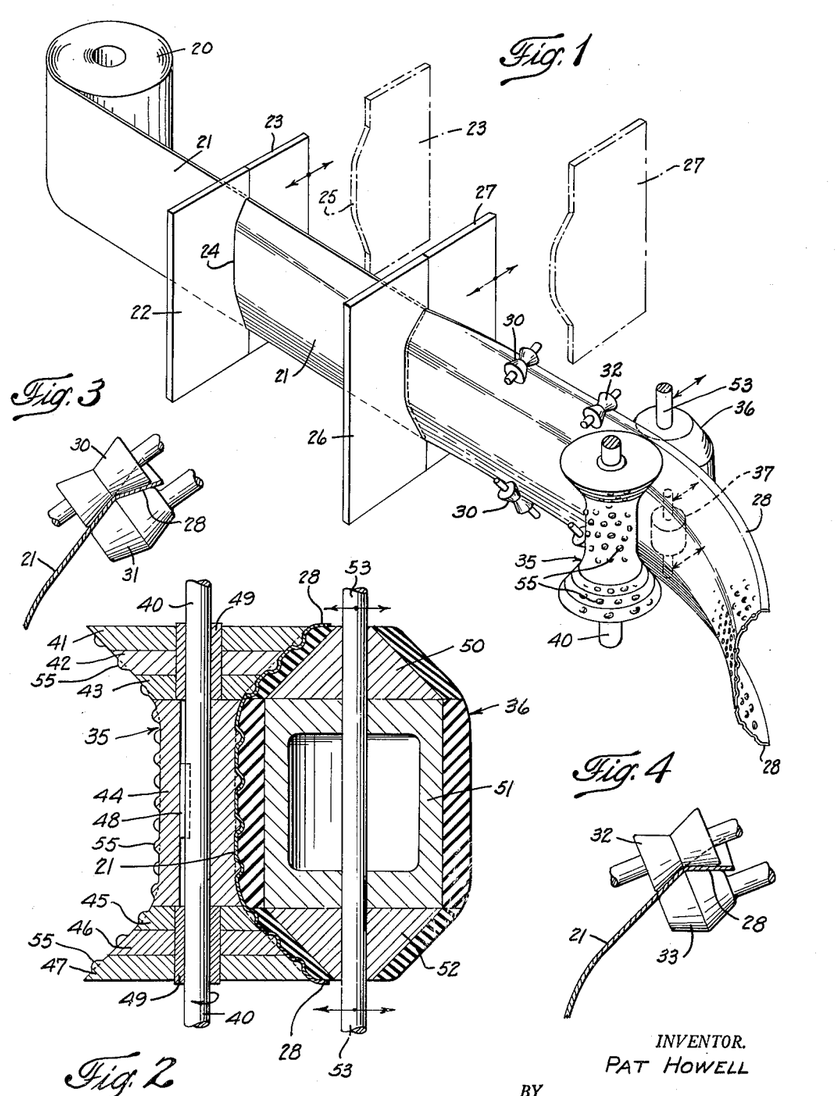
Fig. 1 is a diagrammatic showing of a preferred and illustrative embodiment of the machinery of the present invention used for bending or corrugating a flat, rectangular strip of metal into the desired longitudinal and cross-sectional form in accordance with the method of the invention for use in the buildings of the invention.
Fig. 2 is a view partly in vertical cross-section and partly in elevation of the two main forming rollers and the shafts upon which they are mounted, which are shown in the mechanism of Fig. 1 of the drawings.
Fig. 3 is a detail side elevational view of one pair of side forming rollers shown in Fig. 1 of the drawings, with a piece of metal shown in the bite thereof in cross-section.
Fig. 4 is a detail side elevational view of a second pair of side forming rollers shown in Fig. 1 of the drawings, also showing in cross-section a piece of metal in the bite thereof, Figs. 3 and 4 illustrating the progressive formation of the edge portions of the metallic strip as it passes through the mechanism of Fig. 1.

Referring first to Fig. 1 of the drawings wherein is diagrammatically shown the transverse bending, or corrugating, and longitudinal curving, of a strip of metal to form the building elements going into a structure of the invention, the numeral 20 denotes a cylindrical coil of flat metal strip such as aluminum, steel and the like, which may conveniently serve as the source for the web 21 of metal upon which the corrugating and arching operation takes place. As shown, the flat, metallic web 21 is drawn first between a pair of cooperating forms 22 and 23, the first with a concave edge 24 and the second with a convex edge 25, the operation of said forms being to give an initial, relatively shallow longitudinal corrugation or U cross-section to the web of metal 21.

The web 21 is drawn directly from between forms 22 and 23 to and between a second set of cooperating forms 26 and 27, which are similarly shaped at their adjacent edges to somewhat increase or deepen the longitudinal corrugation of the web of metal. One form each of the pairs of forms just discussed, illustratively shown as forms 23 and 27, is suitably mounted for movement away from its cooperating form, or movement toward and locked or held relationship adjacent thereto, so that the forms may be spaced apart when the web of metal 21 is being "threaded" through the mechanism preparatory to operation, and may be moved together and there held in order to corrugate the web as it is drawn between the forms during operation of the mechanism.

After passage between the second set of forms 26, 27, as described, the metallic web 21 is next curved or crimped in a relatively sharp bend to provide a plane or flat flange portion at each side of the web. The longitudinally corrugated and curved web resulting from the operations of the mechanism shown in Fig. 1, is shown on an enlarged scale in Fig. 9, and the upstanding, plane flanged edges 28 of the formed web 21 may be clearly seen. The said formation is accomplished by two sets of cooperating rollers to operate upon each edge of the advancing web 21 in the mechanism of Fig. 1. The first set of such rollers comprise the cooperating crimping roller set 30, 31, shown in detail in Fig. 3 which gives an initial bend to the metal, and the second set comprises the similar crimping rollers 32, 33, shown in detail in Fig. 4, which complete the desired bend and formation of the flanged edges 28.

The web 21, as thus longitudinally corrugated to a substantial but not the final extent by the operation of form sets 22, 23, and 26, 27, and with the plane edge flanges 28 provided, is next directed through a pair of main forming rollers 35, 36, to complete the deep longitudinal corrugation of the web. Thereafter, the concave or trough-shaped surface of the web 21 may be contacted by a further single roller 37 adapted to engage only the central portion of the corrugated web immediately after it emerges from the bite of rollers 35 and 36. Although, as will hereinafter be explained, the dimpled formation of concave roller 35 of the main forming roller set 35, 36, will give more or less longitudinally curved or arcuate formation to the web 21, the roller 37 is also utilized as desired for the same purpose, since it forces a lengthwise curvature into the web as it emerges from the main forming rollers. As indicated by arrows in Fig. 1, the said roller 37 is mounted in any suitable way for movement into the path of the advancing web, so it may be utilized to put more or less longitudinal curvature into the completed formed web. That is, the longitudinal curvature of the web 21 may be about a larger or smaller radius as desired, and the curvature may be changed when desired by adjustment of roller 37, or the roller may be moved entirely out of contact with the corrugated web 21. The roller 37 is of course adapted to be secured in any adjusted position so as continuously and effectively to exert its curving effect upon the web 21.

It will be recognized that the showing of the mechanism in Fig. 1 of the drawings is illustrative and diagrammatic only, and that any suitable and well-known means will easily be provided for such details as the free rotatable mounting of the roll 20 of metal, the sliding mounting of the sets of forms 22, 23, and 26, 27, as indicated, the free rotatable mounting of roller sets 30, 31, and 32, 33, upon suitably held shafts, the mounting of roller 36 for movement toward and away from roller 35 as indicated, and the movable mounting of roller 37 for the purposes described. The function of the cooperating forms 22—23 and 26—27 may be realized by the use of cooperating rollers, if desired. It will also be appreciated that the compact and simple mechanism of Fig. 1 is adapted for mounting on a truck or wheeled trailer which is taken to the site of the building to be erected, whereby forming of the web 21 as described and cutting into lengths for the elements of the building is done at the building site with transportation thereto of the compact spool 20 of material, rather than the awkward and expensive transportation of the building elements themselves.

Figure 6:
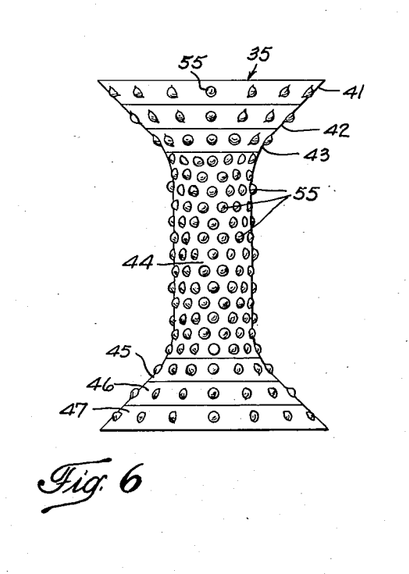
Fig. 6 is a side elevation on an enlarged scale of the concave one of the pair of main forming rollers of the mechanism shown in Fig. 1 of the drawings.

Referring now specifically to the construction and operation of the main forming roller set 35, 36, the said rollers are shown in detail in Fig. 2, and roller 35 is further shown in Fig. 6. The concave roller 35 of the set is mounted on a vertically arranged shaft 40 which may be driven in any suitable way, and thus serves as the means whereby the web 21 is propelled through the forming mechanism shown in Fig. 1. The roller is formed of a plurality of sections, seven as illustratively shown in Fig. 2, being numbered 41 to 47 inclusive in said figure, section 44 being the central, largest section, and the others being arranged in groups of three to either side thereof. The large central section 44 is keyed to shaft 40 as indicated at 48 for driving therefrom, while the other sections of the concave roller are mounted each for independent and free rotation with respect to shaft 40 and with respect to each other, bushings 49 being interposed between the said roller sections and shaft 40.

The convex roller 36 of the main forming roller set 35, 36, also is preferably formed in sections, three in the illustrative embodiment shown in Fig. 2, being numbered 50, 51 and 52. The said roller sections are mounted for free independent relative rotation on shaft 53, and the exterior surfaces of said roller sections preferably comprise a relatively thick layer of rubber or other similarly resilient material.

As shown in the drawings and particularly in Fig. 6, each of the independent roller sections which make up concave roller 35 has an exterior surface formed with a plurality of knobs or round headed protuberances 55, and the said knobs are more numerous per unit of surface area on the central section 44 than on the outer, smaller roller sections, and the numbers of said knobs per unit area likewise diminish for each roller section axially towards the ends of the roller, as for instance, with respect to sections 45, 46 and 47.

Figures 8, 9, 10, 11, 12:
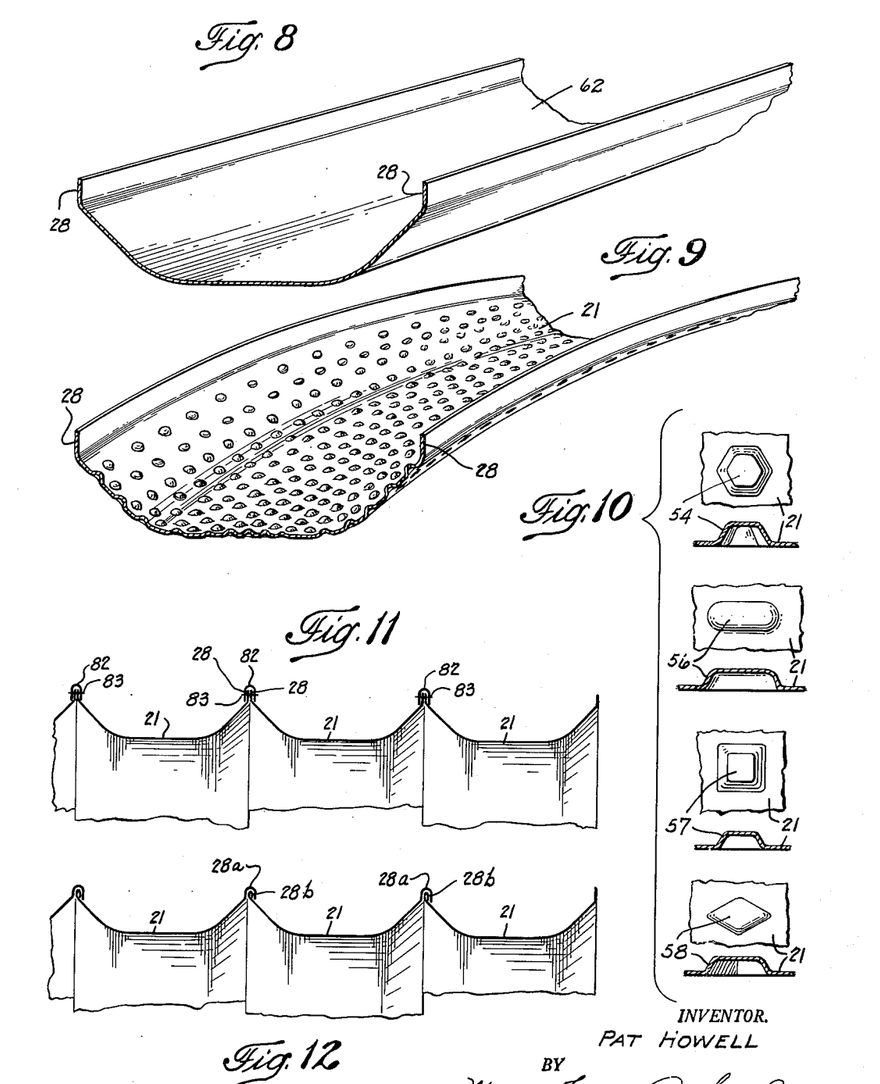
Fig. 8 is a fragmentary perspective view of a corrugated sheet which is the product of the mechanism shown in Fig. 5 of the drawings.
Fig. 9 is a fragmentary perspective view of a corrugated sheet with longitudinal curvature which is the product of the mechanism shown in Fig. 1 of the drawings.
Fig. 10 shows four forms or patterns, each form being shown in top elevation and cross-section, which may be impressed into the corrugated building sheet of the invention, each of which may be an alternative to the dimpled design as shown in the sheet of Fig. 9 of the drawings.
Fig. 11 is a fragmentary diagrammatic side elevation of a building formed of the building elements produced in accordance with the invention, showing the means by which adjacent elements are secured together in the finished structure.
Fig. 12 is a view similar to that of Fig. 11, showing an alternative means for securing adjacent building elements together in the completed structure.

As best seen in Fig. 2, the metallic web 21 is curved to its final, deeply corrugated form by passage between main forming rollers 35 and 36, and the knobs 55 impress a plurality of concave dimples into the web, as clearly shown in Fig. 9. It will be seen that the material of web 21 is gathered or shrunk in area to a greater extent along the central portion of the corrugated web than toward the edges due to the action of the knobs 55 and their relative number per unit area of the roller 35. This deformation of the web 21 and the action of rollers 35, 36, gives a longitudinal, arcuate formation to the web, as clearly illustrated in Figs. 1 and 9. The roller 37 is used to insure or increase this longitudinal curvature as desired and necessary. The radius of said curvature may be changed at any time by increasing or decreasing the pressure with which the roller 36 is made to bear against the web 21 between itself and roller 35, by adjustment of shaft 53, or by adjustment of roller 37 to bear with greater or less pressure against the web 21, or by a combination of these adjustments. Building elements with varying radii of longitudinal curvature may thereby conveniently and economically be made when the desired shape of the completed building requires.

When the web 21 moves through the main forming rollers 35, 36, it will be obvious that the laterally outer portions of the web move along a longer path than the central portions of the web, and but for the sectionalized and relatively independently rotatable nature of the construction of each of the rollers 35 and 36, the metallic web might be strained or torn due to action of the knobs 55. With the sectional rollers shown and described, however, all such damage to the web is avoided, and the various roller sections are allowed to move at different rates of revolution as necessary.

In Fig. 10 there are shown other patterns which may be impressed into the web rather than that described with rounded knobs 55. Thus, 54 indicates the pattern made with hexagonal knobs on roller 35, 56 the design made with oval-shaped protuberances, 57 a square design, and 58 a diamond design. It will readily be appreciated by those skilled in the art that rather than making the protuberances on roller 35, whatever their particular shape, more numerous centrally of the roller and progressively less numerous toward the ends thereof, the protuberances could be longer in the center and shorter toward the edges, or of greater individual area toward the center and less toward the edges, in order to achieve the same result of gathering the metal more centrally of the corrugated web than toward the edges thereof. Of course, the protuberances according to the arrangement described results in the longitudinal curvature of the web in one direction. If curvature in the opposite direction were desired, the web could be gathered more toward the edges thereof than centrally thereof, by choosing the number or shape of the protuberances to bring about that result.

Figure 7:
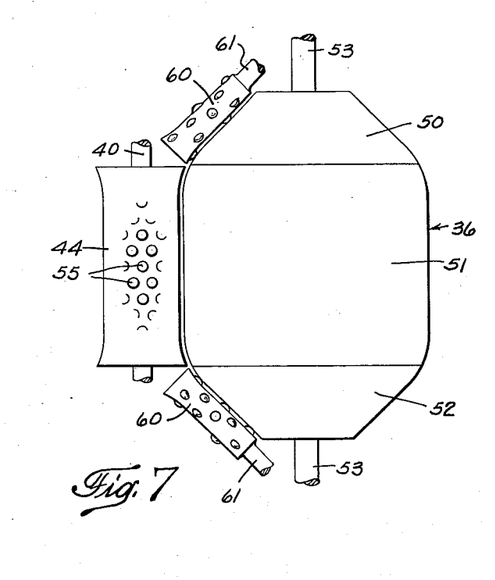
Fig. 7 is a side elevation of a modified embodiment of a pair of main forming rollers for use in the mechanism as shown in Fig. 1 of the drawings.

In Fig. 7 an alternative construction for the main forming rollers is shown wherein the same convex, sectionalized, rubber covered roller 36 is used, but only the central section 44 of the concave roller 35 is needed. In place of the outer roller sections hereinbefore described, a pair of rollers 60 may be positioned as shown for free rotation on shafts 61 to cooperate with roller section 44 in forming the inclined edge portions of the web between that portion formed by section 44, and either plane edge flange 28. The rollers 60 preferably will also be provided with protuberances, which are less numerous than those on the central section 44, and the said construction may be found desirable where less depth of corrugation is desired or thinner metal is being handled.

Figure 5:
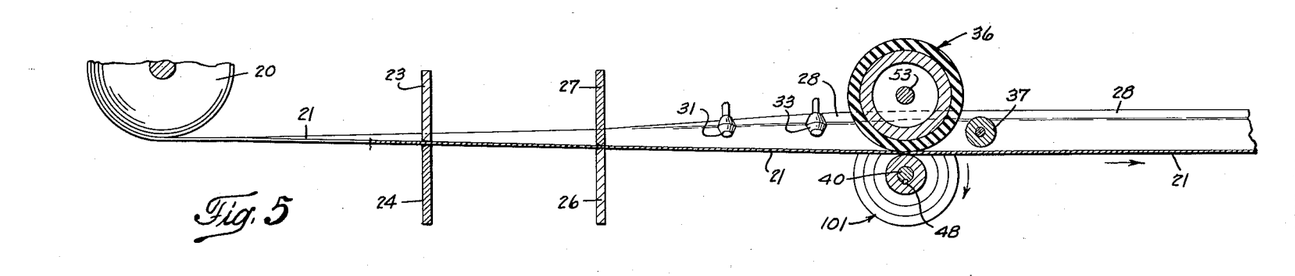
Fig. 5 is a schematic view partly in top plan and partly in cross-section of the mechanism shown in Fig. 1 but with another pair of main forming rollers in operative position, illustrating further aspects of the method of building formation of the invention.

In the schematic drawing of Fig. 5, there is indicated the same mechanism as shown in Fig. 1, except that a sectionalized roller 101 is substituted for roller 35 in the main forming roller set. The said roller 101 is identical to roller 35 except that the exterior surfaces thereof are smooth, without proturberances 55 of any kind thereon. Such substitution may be made in the mechanism of the invention when it is desired to produce a longitudinally corrugated building element which is substantially straight, that is, without longitudinal curvature, such as the element 62 shown in Fig. 8. In this instance, the roller 37 is adjustably moved out of engagement with the advancing corrugated web, in order to avoid its curving effect thereon. A longitudinally corrugated but substantially straight element also may be formed by use of the knobbed roller 35, with roller 36 adjusted so that not much pressure is exerted between the rollers 35, 36.

Figure 13:
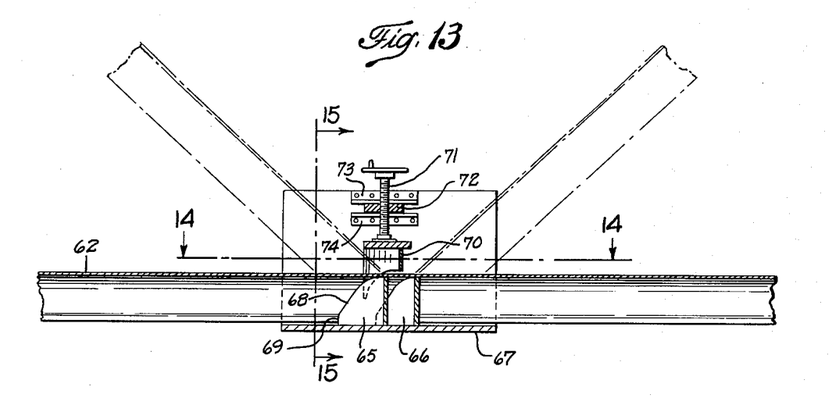
Fig. 13 is a view partly in cross-section and partly in side elevation of additional sheet forming or bending equipment used in making the metallic sheet elements of the invention for certain buildings.
Figure 14:
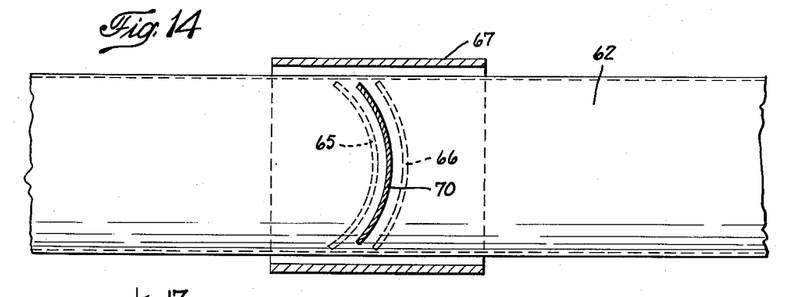
Fig. 14 is a view taken along line 14—14 of Fig. 13.
Figures 15, 17:
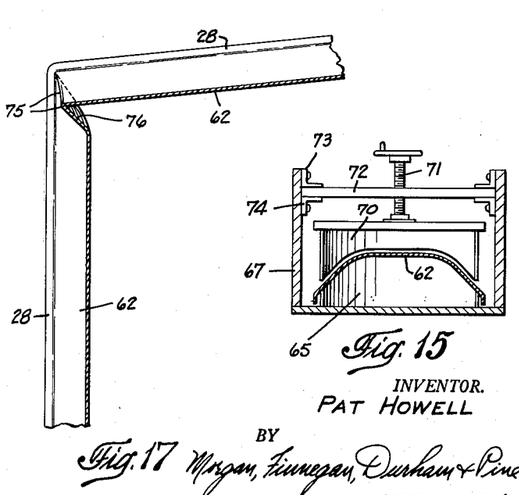
Fig. 15 is a cross-sectional view taken along line 15—15 of Fig. 13.
Fig. 17 is a cross-sectional view taken along line 17—17 of Fig. 16.

In many instances it may be desirable to put sharp bends into the building elements going into a building of particular shape, and the mechanism shown in Figs. 13, 14 and 15 is adapted to this purpose. As there illustratively shown, a length of straight, longitudinally corrugated metal such as 62 shown in Fig. 8 is positioned, concave face downwardly, over a pair of relatively closely spaced supports or forms 65 and 66, which are secured centrally in a framework 67. The said vertically extending forms 65 and 66 are uniformly curved in the direction of the axis of the metallic element 62 placed thereon as best shown in Fig. 14, and the upwardly extending webs thereof are substantially as high as the depth of the corrugation in the element 62, at their central portions. The said webs of forms 65 and 66 slope or decrease in height evenly from their said central portions toward each edge, as shown at 68 in Fig. 13, and then descend substantially vertically at either edge as indicated at 69, the said forms thus being shaped to fit generally the inner surface or contour of the element 62 placed over them.

The bending of the element 62 is accomplished by a movable form or blade 70 which is vertically movably mounted by screw 71 threadedly engaged in block 72. The said block 72 is supported against vertical movement on framework 67, and movable between guides 73 and 74, so that the position of form 70 may be adjusted in the distance between forms 65 and 66. The form 70 has a configuration along its lower edge adapted to conform to and engage the outer convex surface of the corrugated building element 62, as shown in Figs. 13 and 15.

Figure 16:
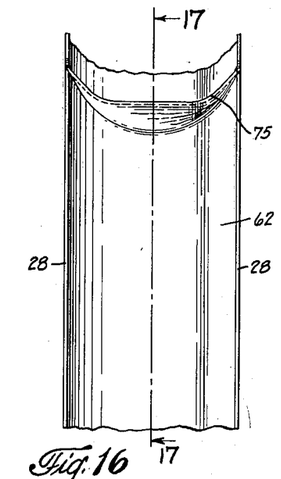
Fig. 16 is a fragmentary elevational view of a metallic building element or sheet after bending in the mechanism shown in Figs. 13, 14 and 15.

With the mechanism shown and described, the building element 62 is positioned over forms 65 and 66, the form 70 adjusted as desired above and between the said forms, and form 70 is then forced downwardly by action of screw 71, imparting a sharp bend to the element 62 and causing it to assume the position shown in broken lines in Fig. 13. As shown in Fig. 16, the corrugated building element is sharply bent along a curved line 75, and excess material in the element is smoothly overlapped as indicated at 76 in Fig. 17. It has been found that a satisfactory sharp bend in an element 62 may be made by the use of a single fixed form, as for instance form 65, and the cooperation of the vertically movable form 70. It has also been found that after a bend has been well started in the element 62, the element may be completely removed from the bending mechanism, and the bend may be continued, or the angle between the two sides lessened, by exerting pressure in a direction which would tend to force the two sides into a parallel position. That is, after the bend has been started in the bending mechanism it may be removed from the mechanism, and the bend made sharper by moving the two ends of the element toward each other. The use of the cooperating curved forms 65 and 70, and 66 when two fixed forms are used, has been found to be very desirable in forming building elements which will readily permit water to run off of the roof past the bent portion, which is the juncture between the roof and side wall portions of the structure. In making such building elements the curvature of the forms is toward the direction which will be pointed toward the ground when the element is assembled in the building. Thus, each element 62 which is bent in the mechanism of Fig. 13 is positioned in opposite directions for the making of two bends where said two bends form the juncture between a roof, and two side wall portions, and the downwardly curved overlap will not dam up water running off of the roof portion. However, an effective and efficient bend may be made in the building elements by using straight forms instead of curved as shown, and this is the preferred form in bending at the gable of a gabled roofed building.

Figure 18:
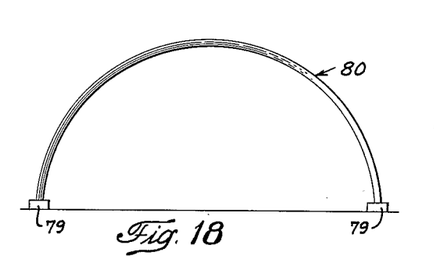
Fig. 18 is an end elevation of one of the buildings of the invention made of the elements and in accordance with the method of the invention.
Figure 19:
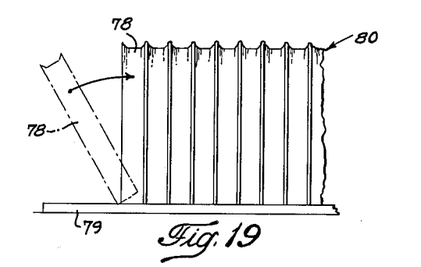
Fig. 19 is a diagrammatic showing of the method of assembling the arcuate building elements or sheets of the invention into the building shown in Fig. 18.

Turning now to the erection of the desired form of building in accordance with the present invention, the web 21 which has been longitudinally corrugated and formed in the mechanism and in accordance with the method described, preferably near the site where the building is to be erected, is cut into the required length as it comes from the forming machinery, in order to provide a building element integrally formed and adapted to extend from one side support or foundation to the other. It will be understood, of course, that the proper lengths of material may be cut from the roll 20 before they are formed as has been described rather than afterward, but forming the metallic strip from roll 20 and then cutting into lengths will usually be the more efficient procedure. As shown in Fig. 19, the finished building element is designated by the number 78, the drawing illustrating how a plurality of such elements are assembled in side by side, contiguous relationship upon parallel foundations 79 to form the building 80, shown also in Fig. 18. The building so formed is made of a plurality of elements 78 each of which has been fashioned on the mechanism shown in Fig. 1 and with the longitudinally corrugated and curved web illustrated in Fig. 9. In this instance each building element 78 has a uniform radius of curvature along its length, as a result of retaining in a fixed position the adjustment of main forming rollers 35, 36, and roller 37 throughout production of the building elements.

The foundations 79 are shown as relatively short in height, but it will be understood that such supports could be much higher and form part or all of the side portions of the building, with the building elements of the invention extending from support to support and providing a self-sustaining roof portion for the structure.

The building elements 78 are lifted into position on foundations 79 by any suitable mechanism as for instance by a crane or gin pole, and are secured together by suitable means, preferably so that a non-leaking joint is formed between the adjacent arches. Illustrative means for so securing the elements together are diagrammatically shown in Figs. 11 and 12. In Fig. 11 the elements 78 are shown in their assembled side-by-side relationship with the plane flange portions 28 of adjacent arches in abutment, and a separate, longitudinally corrugated and curved cap member 82 is positioned over the said flange portions, and means such as rivets or bolts 83 are passed through the two abutting flanges and the overlapping skirts of cap member 82. In Fig. 12 an alternative means is shown, wherein one flange portion 28a is turned or crimped over the abutting flange 28b, and the joint may be reinforced and secured by bolts, rivets, or welding as may be desired. The several arched building elements 78 may be secured in place on the foundation portions 79 in any suitable and efficient manner, as for instance by placing in a longitudinal trough provided in the foundation which is thereafter cemented around the ends of the elements, or by affixing to an angle rail or other anchor means at the top of the foundation which are themselves firmly secured to the foundation.

With the means and following the method described, it will be appreciated that a building 80 has been efficiently and economically fabricated in which each of the metallic elements is strongly formed so as to be self-supporting, and each such element extends integrally from support to support at each side forming, in the illustrative embodiment under discussion, both the roof and side wall structure. No other supporting means are required for this portion of the completed structure, although such other interior structure, and closing of the building at the ends, may be added as desired to fit the building for its intended purpose.

Figure 20:
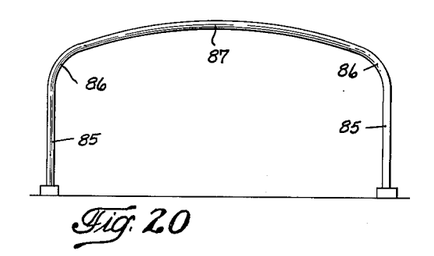
Figs. 20 and 21 each show other and different metallic buildings which may be made in accordance with the invention.

In Fig. 20 there is shown another building which may conveniently be fabricated in accordance with the invention, where in relatively straight side wall portions 85 are provided in each integral, corrugated and arched building element, which merge into longitudinal curves 86 wherein the metallic web has been curved about a relatively short radius, and thereafter there is provided a top portion 87 wherein longitudinal curvature of the building element about a longer radius of curvature has been accomplished. The arched building elements for the said building may be made by suitable adjustment of the rollers 36 and 37 during the process of forming each individual arch. During formation of the side wall portion 85, the roller 37 may be taken out of operation, and a relatively light pressure of roller 36 against its cooperating roller 35 will longitudinally corrugate the web 21 but not give it any substantial arcuate formation. The pressure of roller 36 may thereafter be increased, and roller 37 brought into operation to form the tight arcuate portion 86, the pressures relaxed to form the top portion 87 in the element, and thereafter the operations are duplicated to form the other side of the element.

Figure 21:
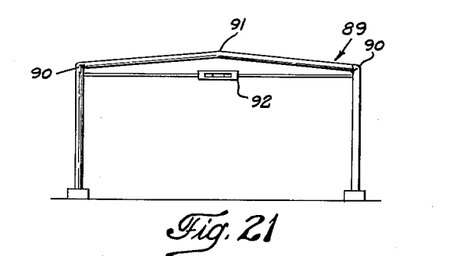

The building 89 shown in Fig. 21 may conveniently be formed with the mechanism shown in Fig. 5 of the drawings producing a straight corrugated web shown in Fig. 8. The mechanism shown and described in connection with Figs. 13 to 17 inclusive of the drawings may be used to produce the sharp bends 90 at the termination of the side walls, with a sharp but flatly angular bend 91 produced at the peak of the roof portion of each building element. For large span buildings it may be desirable to provide a turn buckle support 92 between the sides of the building, or truss supports or other equivalent means.

It will be apparent, of course, that the bending mechanism shown in Fig. 13 may be utilized with a longitudinally curved web as shown in Fig. 9 as well as with a straight, corrugated web such as that shown in Fig. 8, so that many different building forms may be made with the mechanism and in accordance with the method of the invention, using straight or longitudinally curved lengths of corrugated metallic web, and providing variations in longitudinal curvature or sharp bends along the length of the elements as desired. Whether longitudinal curving or relatively sharp bends are imparted to the elements, it will be seen that longitudinally corrugated building elements have been provided which are likewise strongly longitudinally shaped, so that they may be assembled in side-by-side relationship on side supports or foundations, and they form a self-sustaining part of the total building structure.

Figure 22:
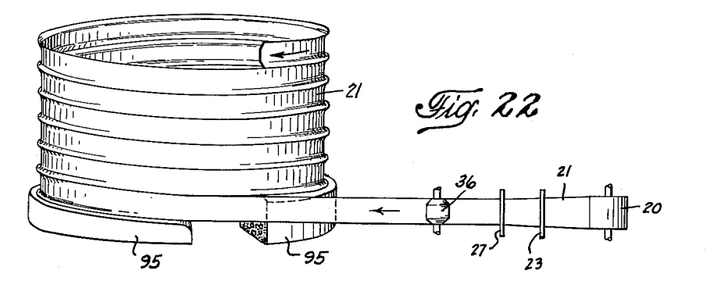
Fig. 22 shows a partially completed metallic, spiral type of building which may be made in accordance with the invention, together with a schematic showing of the mechanism in position for fabricating the building.
Figure 23:
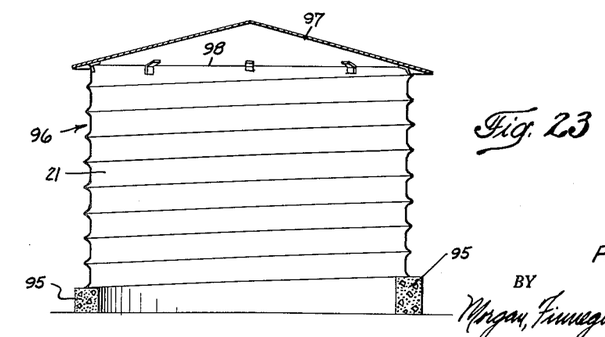
Fig. 23 shows the spiral type of building of Fig. 22 in completed form.

Figs. 22 and 23 disclose a circular or silo type structure 96 which may be fabricated in accordance with the invention. As there shown, a foundation 95 is provided, the upper surface of which has a spirally increasing elevation, and the forming machinery shown in Fig. 1 is utilized for the continuous and integral formation of the entire side wall portion of the building. The building will rotate on the foundation as it is fabricated until the desired height has been reached, and it may be completed by the installation of a suitable roof 97, the upper edge 98 having first been leveled by cutting off a wedge-shaped portion of the web at the upper edge of the building, as will be obvious. In making the spiral building of Fig. 22, the continuous, corrugated building element may be formed by the adjustment of roll 37, Fig. 1, so that its upper or top portion exerts greater pressure against the web 21 than its lower portion, and the adjustment of roll 36 so that its upper portion also exerts greater pressure against the intervening metallic web than its lower portion. Also, it may be desirable to provide a roll 35 whereon there are more, or larger in area, knobs 55 distributed toward the upper end of the roll than are shown, thus contributing to the spiral formation of the web.

The invention in its broader aspects is not limited to the specific mechanisms shown and described, but departures may be made therefrom, within the scope of the accompanying claims, without departing from the principles of the invention and without sacrificing its chief advantages.

What is claimed is:

1. That method of building construction which includes the steps of initially forming a strip of flat metallic stock in a cold state from a coiled supply to impart a laterally concave configuration thereto, forming a plurality of discrete embossments in said strip with said embossments in selectively varying spaced relationship and defining relatively undeformed interconnected areas distributed throughout the area of said stock, said embossments establishing a predetermined longitudinal curvature of said web in the direction opposite said concave face, said undeformed areas being interconnected in both lateral and longitudinal directions of said stock resisting bending stresses to form a relatively rigid self-supporting unitary pre-shaped major structural component of said building.

2. That method of building construction which includes the steps of providing a supply of coiled metallic flat stock, forming a plurality of substantially identical elongated webs from said supply with a transverse trough-like concavity extending throughout their lengths, forming a plurality of embossments in said webs in selectively varying spaced relation and depth establishing a longitudinal curvature thereof in the direction opposite to said trough-like lateral concavity to establish said longitudinal curvature of each of said webs in correspondence with a predetermined major contour of said building, said embossments defining relatively undeformed interconnected areas distributed throughout the surface of each web and forming generally longitudinal stress resistant avenues whereby each of said webs is rendered a substantially rigid unitary major structural component of said building, assembling said webs in side-by-side relationship and securing said webs together to form a self-supporting building structure.

3. The method of building construction according to claim 2 wherein each of said shaped unitary webs extends from one side support of said building to the other side support thereof, and wherein said selectively varying spaced relationship of said embossments comprises wider spacing thereof at the sides than at the bottom of said trough-like concavity.

4. That method of forming a substantially rigid building component to provide such component with a predeterminad longitudinal contour for a building to be constructed, which includes the steps of forming a trough from an elongated strip of sheet metal, forming a plurality of embossments under pressure on said trough in selectively varying spaced relation and with relatively undeformed areas therebetween and distributed throughout the surface of said trough to stiffen said trough and impart a longitudinal curvature thereto, and adjusting the magnitude of said embossing pressure to bring said curvature into conformity with said predetermined contour.

5. A method according to claim 4 wherein said predetermined contour comprises regions of greater and of lesser radii of curvature.

6. The method of building construction comprising the steps of forming an elongated web of strip sheet material to produce a trough-like member having longitudinal edges constituting parallel flange parts, and shaping said member longitudinally by selective embossment thereof with said flange parts directed outwardly to form a unitary self-supporting building element adapted to bridge spaced main building support means, said embossments being distributed in spaced relationship to form interconnected areas of relatively unembossed material distributed throughout all portions of said member.

7. The method according to claim 6 wherein one of said longitudinal edges is formed in an inverted U-shaped section to receive the other longitudinal edge of a like adjoining elemental section.

8. That method of building construction which includes forming a plurality of elongated building elements of sheet material each curved laterally in one direction, imparting a plurality of spaced indentations to each of said elements with the number of said indentations per unit area being maximum near the longitudinal center-line and minimum near the side edges of said element to impart longitudinal curvature thereto in a direction opposite to said lateral curvature, controlling the depth and number of said indentations to bring said longitudinal curvature into correspondence with a predetermined contour of a building to be constructed, whereby each of said elements is rendered a substantially rigidly self-supporting unitary structural component of said building, erecting said elements in side-by-side relation, and securing the abutting sides of said elements together to form an integrated self-supporting building structure having said predetermined contour.

9. The method of building construction comprising the steps of forming a circular building foundation having an upper, building-receiving surface in the form of a single turn helix to receive and support the side wall of a cylindrical building, continuously forming an elongated web of flat stock by imparting a transverse concavity thereto and then selectively embossing transverse portions of said web to establish a longitudinal curvature in a direction opposite to said concavity and with a radius of curvature corresponding to the radius of said foundation, feeding the formed web onto said foundation as the web is formed and securing successive turns of said web in edge-to-edge relationship to initiate formation of the wall of the building, continuously rotating the formed building wall to receive successive spiral turns of said web until the desired building height is attained, and severing the web at the base of the building.

10. The method of making a building element which includes the steps of concavely forming an elongated web from a supply of flat metallic stock to provide a trough-like member having a laterally concave face curved about a longitudinally extending axis of the web and forming embossments in said web in spaced relation laterally of said stock to provide a longitudinal curvature of said web in conformity with a predetermined contour, said embossments in being spaced one from the others defining intervening, interconnected areas of relatively uninterrupted material extending longitudinally of said stock and distributed transversely thereof to form a rigid structure.

11. The method of making a building element set forth in claim 10 wherein said longitudinal curvature-providing step includes moving said web in firm engagement with an embossing roller formed of a plurality of independently rotatable sections.

References Cited in the file of this patent

UNITED STATES PATENTS

| | | |
|---|---|---|
| 93,181 | Cushing | Aug. 3, 1869 |
| 673,041 | Ault | Apr. 30, 1901 |
| 857,983 | Cowles | June 25, 1907 |
| 1,016,032 | Pruden | Jan. 30, 1912 |
| 1,182,082 | Fouts | May 9, 1916 |
| 1,184,947 | Gossett et al. | May 30, 1916 |
| 1,229,477 | Kramer | June 12, 1917 |
| 1,266,545 | Anderson | May 21, 1918 |
| 1,428,344 | Scouler | Sept. 5, 1922 |
| 1,748,423 | Macomber | Feb. 25, 1930 |

(Other references on following page)

UNITED STATES PATENTS

| | | | |
|---|---|---|---|
| 1,880,479 | Ragsdale | Oct. 4, | 1932 |
| 2,012,795 | Park | Aug. 27, | 1935 |
| 2,075,286 | Jackes | Mar. 30, | 1937 |
| 2,124,931 | Ruegenberg | July 26, | 1938 |
| 2,165,282 | Loggins | July 11, | 1939 |
| 2,199,152 | Edge et al. | Apr. 30, | 1940 |
| 2,279,197 | Hoell | Apr. 7, | 1942 |
| 2,424,947 | Welham | July 29, | 1947 |
| 2,436,543 | Blaski | Feb. 24, | 1948 |
| 2,465,376 | Hooper | Mar. 29, | 1949 |
| 2,692,003 | Nieman et al. | Oct. 19, | 1954 |
| 2,751,672 | Reed | June 26, | 1956 |
| 2,775,284 | Hermann | Dec. 25, | 1956 |
| 2,786,435 | Ellzey | Mar. 26, | 1957 |

FOREIGN PATENTS

| | | | |
|---|---|---|---|
| 125,544 | Great Britain | Apr. 24, | 1919 |